United States Patent
Esparza Garcia et al.

(10) Patent No.: US 10,290,080 B2
(45) Date of Patent: May 14, 2019

(54) METHOD FOR DISPLAYING A VEHICLE ENVIRONMENT OF A VEHICLE

(71) Applicant: Robert Bosch GmbH, Stuttgart (DE)

(72) Inventors: Jose Domingo Esparza Garcia, Stuttgart (DE); Raphael Cano, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/554,607

(22) PCT Filed: Mar. 30, 2016

(86) PCT No.: PCT/EP2016/056863
§ 371 (c)(1),
(2) Date: Aug. 30, 2017

(87) PCT Pub. No.: WO2016/162245
PCT Pub. Date: Oct. 13, 2016

(65) Prior Publication Data
US 2018/0040103 A1    Feb. 8, 2018

(30) Foreign Application Priority Data
Apr. 10, 2015 (DE) .......... 10 2015 206 477

(51) Int. Cl.
*B60R 1/00* (2006.01)
*G06T 5/20* (2006.01)
(Continued)

(52) U.S. Cl.
CPC .............. *G06T 3/4038* (2013.01); *B60R 1/00* (2013.01); *G06T 5/002* (2013.01); *G06T 5/20* (2013.01);
(Continued)

(58) Field of Classification Search
CPC ........... B60R 1/00; G06T 5/20; G06T 15/205; H04N 5/247
(Continued)

(56) References Cited

U.S. PATENT DOCUMENTS

| 7,161,616 B1* | 1/2007 | Okamoto ............... B60R 1/00 348/148 |
| 2014/0139676 A1 | 5/2014 | Wierich |
| 2016/0026253 A1* | 1/2016 | Bradski ............... G02B 27/225 345/8 |

FOREIGN PATENT DOCUMENTS

| DE | 102011121473 A1 | 6/2013 |
| EP | 1179958 A1 | 2/2002 |

(Continued)

OTHER PUBLICATIONS

International Search Report Jul. 4, 2016, of the corresponding International Application PCT/EP2016/056863 filed Mar. 30, 2016.

*Primary Examiner* — Jeffery A Williams
(74) *Attorney, Agent, or Firm* — Norton Rose Fulbright US LLP; Gerard Messina

(57) ABSTRACT

A method for displaying a vehicle environment of a vehicle, including a detection of the vehicle environment in camera images with the aid of a plurality of cameras; projecting the camera images onto a geometrical projection surface in a virtual space, setting up a depth map for a visual range of a virtual camera that describes a distance of a plurality of points of the geometrical projection surface from the virtual camera in the virtual space; calculating an image from the virtual camera that images the geometrical projection surface in the virtual space; ascertaining, based on the depth map, a particular region of the image from the virtual camera in which the geometrical projection surface lies in a certain distance range in relation to the virtual camera; and Gauss- (Continued)

ian blurring of the image from the virtual camera in the region in which the particular region is imaged.

7 Claims, 4 Drawing Sheets

(51) Int. Cl.
*G06T 15/20* (2011.01)
*H04N 5/00* (2011.01)
*G06T 3/40* (2006.01)
*G06T 15/50* (2011.01)
*G06T 5/00* (2006.01)
*H04N 5/232* (2006.01)
*H04N 5/247* (2006.01)

(52) U.S. Cl.
CPC .......... *G06T 15/205* (2013.01); *G06T 15/503* (2013.01); *B60R 2300/105* (2013.01); *B60R 2300/30* (2013.01); *B60R 2300/8093* (2013.01); *H04N 5/23238* (2013.01); *H04N 5/247* (2013.01)

(58) Field of Classification Search
USPC .......................................................... 348/36
See application file for complete search history.

(56) References Cited

FOREIGN PATENT DOCUMENTS

| JP | 3300334 B2 | 7/2002 |
| JP | 2005258792 A | 9/2005 |
| JP | 2015045920 A | 3/2015 |
| WO | 2008150153 A1 | 12/2008 |

\* cited by examiner

METHOD FOR DISPLAYING A VEHICLE ENVIRONMENT OF A VEHICLE

FIELD

The present invention relates to a method for displaying a vehicle environment of a vehicle.

BACKGROUND INFORMATION

Driver-assistance systems aim to assist a driver in controlling a vehicle. Such an assistance of the driver may be provided by the following functions:
- Displaying an environment in close range of the vehicle in order to avoid collisions with obstacles that are not located in the driver's direct field of vision;
- Assuming some of the tasks of the driver in order to enhance the driving comfort for the driver;
- Monitoring activities of the driver, and intervening in dangerous situations; and/or
- Automated driving without the driver necessarily having to be present.

In particular, the present invention relates to a method for displaying a vehicle environment with the aid of a composite view as it takes place especially in what is known as a surround view system. In such surround view systems, multiple cameras are typically mounted on a vehicle in such a way that a representation of a 360-degree view of the vehicle environment is made possible. As a rule, camera images from cameras disposed on the vehicle, usually four cameras, are projected onto a geometrical projection surface, which typically has the form of a bowl. This is done with the aid of an image point allocation (image mapping), which is based on an intrinsic and an extrinsic camera calibration.

German Patent Application No. DE 102011121473 A1 describes a method for displaying images on a display device of a motor vehicle by capturing a camera image of a surrounding region of the motor vehicle with the aid of a camera of the vehicle.

U.S. Patent App. Pub. No. 2014/0139676 A1 describes a vision system for a vehicle that includes at least one image sensor, a control, and a display.

SUMMARY

An example method according to the present invention for the display of a vehicle environment of a vehicle encompasses a detection of the vehicle environment in camera images with the aid of a plurality of cameras; a projection of the camera images onto a geometrical projection surface in a virtual space; a creation of a depth map for a visual range of a virtual camera, which describes a distance of a plurality of points of the geometrical projection surface from the virtual camera in the virtual space; a calculation of an image from the virtual camera that images the geometrical projection surface in the virtual space; an ascertainment, based on the depth map, of a particular region of the image of the virtual camera, in which the geometrical projection surface lies in a particular distance range in relation to the virtual camera; and Gaussian blurring of the image of the virtual camera in the region in which the particular region is imaged.

This guides the driver's gaze when the driver is looking at the calculated image. Also, unintentional differences between the image from the virtual camera and the vehicle environment that the virtual camera images and that appear in the particular regions of the geometrical projection surface are blurred and therefore hidden, in particular. Such unintentional differences sometimes result from the fact that the geometrical projection surface in the virtual space does not precisely reproduce the vehicle environment in its form.

Further developments of the present invention are described herein.

It is advantageous if the geometrical projection surface is modeled on the basis of the vehicle environment. This minimizes unintentional differences between the image from the virtual camera and the vehicle environment that the virtual camera images.

It is also advantageous if the determined distance range is a range that extends beyond a minimum distance in relation to the virtual camera. This creates a depth effect, and the image of the virtual camera has a particularly three-dimensional effect.

Moreover, it is advantageous if a virtual model of the vehicle is situated in the virtual space, and if the depth map is set up in such a way that a virtual model of the vehicle is situated in the virtual space; it is also advantageous if the depth map is set up in such a way that for the particular regions of the image from the virtual camera in which virtual model 14 of vehicle 1 is detected, the depth map describes a distance between the points of virtual model 14 of vehicle 1 imaged therein and the virtual camera. The virtual model of the vehicle offers the user a reference point in the image from the virtual camera. By taking the virtual model of the vehicle into account when setting up the depth map, it inserts itself into the image from the virtual camera and thus will not be perceived as a foreign element in the vehicle environment.

It is also advantageous if the method includes orienting the virtual camera to a particular point of interest in the virtual space. This makes it possible to direct the user's attention to the particular point.

In addition, it is advantageous if the particular point of interest is a point at which the vehicle approaches an object. The user is therefore made aware of this approach, and collisions are able to be prevented.

A device that is designed to execute the method according to the present invention is also advantageous and offers all of the advantages of the method according to the present invention.

BRIEF DESCRIPTION OF THE DRAWINGS

Below, exemplary embodiments of the present invention are described in greater detail with reference to the figures.

DETAILED DESCRIPTION OF EXAMPLE EMBODIMENTS

Figure 1:
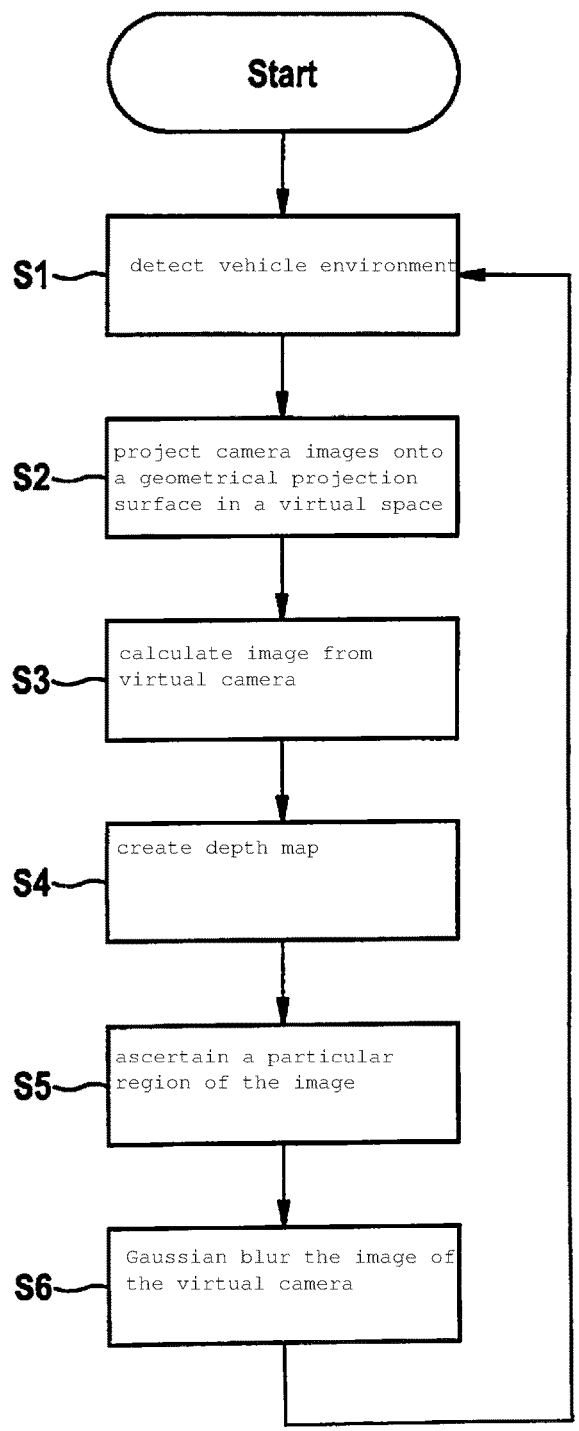
FIG. 1 shows a flow diagram of the method according to the present invention in a first specific embodiment.

FIG. 1 shows a flow diagram of the method according to the present invention for the display of a vehicle environment of a vehicle 1 in a first specific embodiment.

Figure 2:
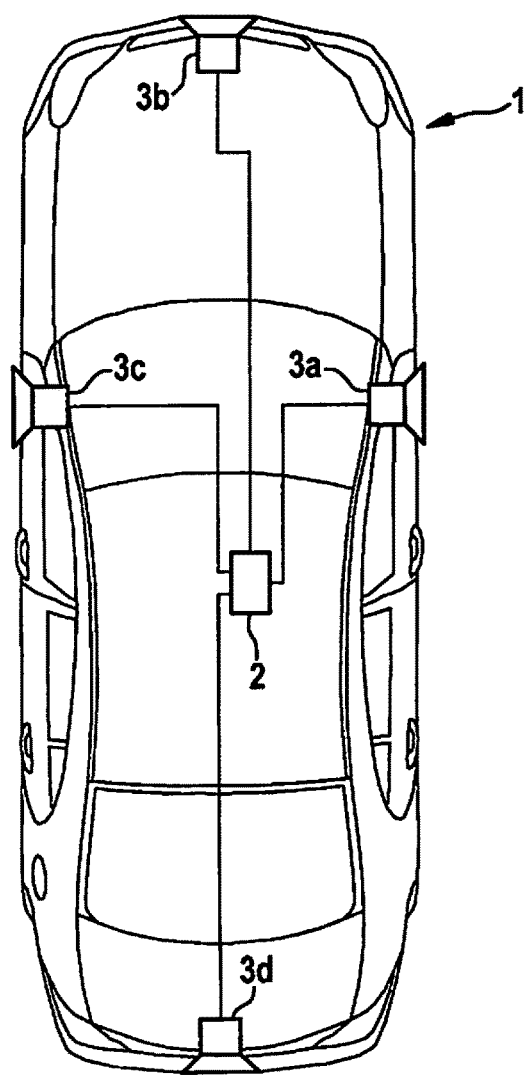
FIG. 2 shows a vehicle equipped with a device for executing the method in the first specific embodiment.

The method is executed by a device 2 for displaying a vehicle environment of vehicle 1. Vehicle 1 is shown in FIG. 2 by way of example.

A first camera 3a, a second camera 3b, a third camera 3c, and a fourth camera 3d are disposed on vehicle 1. Each camera 3a, 3b, 3c, 3d is equipped with a respective fisheye lens in order to record the largest possible section of the vehicle environment of vehicle 1. First camera 3a is mounted on a outside mirror of vehicle 1 on the right side. An optical axis of first camera 3a is pointing away from vehicle 1 along a transverse axis of vehicle 1. Second camera 3b is disposed on a vehicle front of vehicle 1. An optical axis of second camera 3b is pointing away from the vehicle along a longitudinal axis of vehicle 1. Third camera 3c is disposed on a left outside mirror of vehicle 1. An optical axis of third camera 3c is pointing away from the vehicle along the transverse axis of vehicle 1. Fourth camera 3d is disposed on a rear side of the vehicle of vehicle 1, and an optical axis of fourth camera 3d is pointing away from vehicle 1 along the longitudinal axis of vehicle 1. Each camera 3a, 3b, 3c, 3d is coupled with device 2 for displaying the vehicle environment of vehicle 1 via a respective signal line. Device 2 for displaying the vehicle environment of vehicle 1 is a digital processing unit.

The example method according to the present invention is started as soon as device 2 for displaying the vehicle environment of vehicle 1 is taken into operation. A first step S1 is executed after the start of the method.

In first step S1, the vehicle environment of vehicle 1 is detected in camera images with the aid of camera 3a, 3b, 3c, 3d. Each camera 3a, 3b, 3c, 3d records an image and transmits it to device 2. The camera images from cameras 3a, 3b, 3c, 3d, which are disposed next to one another on vehicle 1, overlap one another and thus image an identical region of the vehicle environment in a cutaway.

A second step S2 is carried out following first step S1.

In second step S2, the camera images are projected onto a geometrical projection surface in a virtual space. The virtual space is a mathematical space that is arithmetically generated by device 2. The virtual space is a mathematical representation of the actual space around vehicle 1. A virtual model 14 of vehicle 1 is disposed in the virtual space. The geometrical projection surface envelops virtual model 14 of vehicle 1 in the virtual space.

The geometrical projection surface is modeled on the basis of the vehicle environment. For this purpose the vehicle environment is scanned with the aid of a vehicle sensor system. The vehicle sensor system is a system for sensing the environment of vehicle 1, which is based on ultrasonic sensors, stereo cameras or a LIDAR system, for example. Distance values are recorded that describe a distance between objects located in the vehicle environment and the vehicle. These distance values are transferred to the virtual space, and a distance of the geometrical projection plane from virtual model 14 of vehicle 1 is adapted in accordance with the distance values.

When the camera images are projected onto the geometrical projection surface, the camera images from cameras 3a, 3b, 3c, 3d are placed onto the geometrical projection surface in the form of textures. The camera images are rectified in such a way that the actual objects in the vehicle environment shown in the camera images appear at a position of the geometrical projection surface whose location in relation to virtual model 14 of vehicle 1 corresponds to the location of the actual object in relation to vehicle 1.

A third step S3 is carried out following second step S2.

In third step S3, image 10 from the virtual camera, which images the geometrical projection surface in the virtual space, is calculated.

To do so, a position and an orientation of the virtual camera in the virtual space are first specified. The position of the virtual camera may be assumed to be on the right behind model 14 of vehicle 1 by way of example. Thus, the camera is situated in the rear region of a model 14 of vehicle 1 in the virtual space. By way of example, the orientation of the virtual camera is selected along a right side of model 14 of vehicle 1 in the direction of a front of model 14 of vehicle 1.

The image from virtual camera 10 is made up of a matrix of image points. For each image point a calculation is carried out on the basis of the position and the orientation of the virtual camera in order to ascertain which part or point of the geometrical projection surface is depicted in an image point. A color value and/or a brightness value of an image point of the image from the virtual camera is selected according to a color value and/or a brightness value of the texture disposed in the corresponding part or point of the projection surface.

Figure 3:
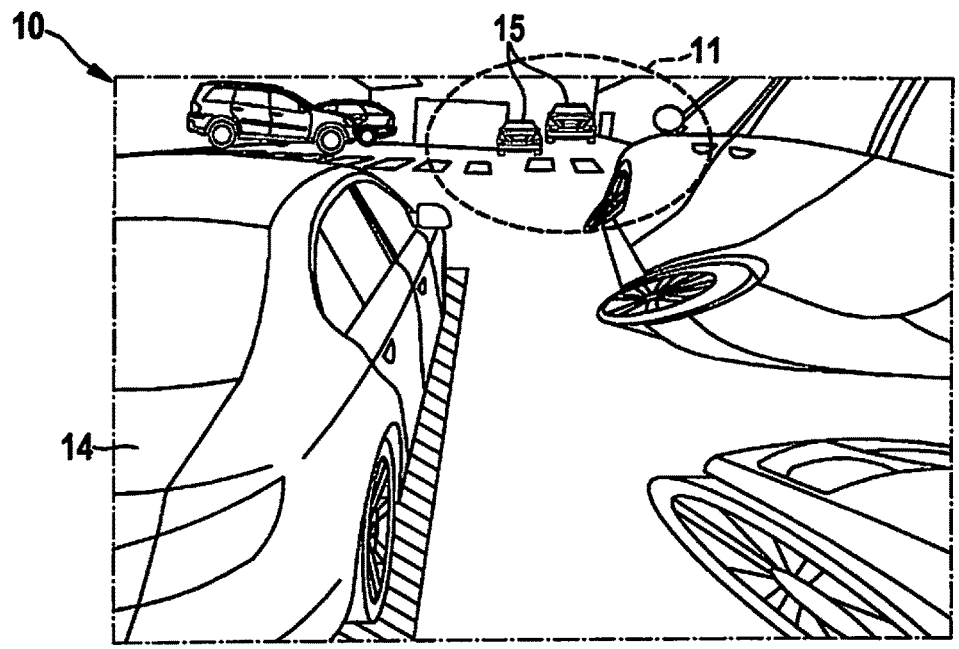
FIG. 3 shows an image of a virtual camera, where no Gaussian blurring of predefined regions of camera images has taken place.

FIG. 3 shows an exemplary image of the virtual camera, where Gaussian blurring has not yet taken place. Virtual model 14 of vehicle 1 is located in a left region of image 10 from the virtual camera. The geometrical projection surface with the camera images deposited thereon in the form of textures can be seen in the region around virtual model 14 of vehicle 1. In a region 11 of image 10 from the virtual camera that is located to the right in front of virtual model 14 of vehicle 1 lies an unintentional difference between the image from the virtual camera and the vehicle environment imaged by the virtual camera. It is clear that an individual vehicle 15 is shown twice.

Individual vehicle 15 is depicted twice because, for one, it is imaged in the camera image from first camera 3a; for another, it is imaged in the camera image from second camera 3b. When the camera images were projected onto the geometrical projection surface, the two representations of individual vehicle 15 were not placed in the same location of the geometrical projection surface because the form of the geometrical projection surface does not fully correspond to the forms of the vehicle environment.

Following third step S3, a fourth step S4 is executed.

In fourth step S4, a depth map for a visual range of the virtual camera is created, which describes a distance of multiple points of the geometrical projection surface from the virtual camera in the virtual space. The visual range of the virtual camera corresponds to the range that is depicted in the image of the virtual camera.

For each image point of image 10 from the virtual camera, a calculation is carried out in order to determine the distance between the point of the geometrical projection surface imaged in this image point and the position of the virtual camera. This distance is stored as a distance value in the depth map. Therefore, in this specific embodiment, the depth map has as many distance values as there are image points in image 10 from the virtual camera. An image point of image 10 from the virtual camera is allocated to each distance value of the depth map.

The depth map is set up in such a way that for the particular regions of the image from the virtual camera in which virtual model 14 of vehicle 1 is detected, the depth map describes a distance of the points of virtual model 14 of vehicle 1 that are depicted therein from the virtual camera in the virtual space. Entered in the depth map is therefore a distance value that describes a distance between virtual model 14 of vehicle 1 when the geometrical projection surface for the associated image point is hidden by virtual model 14 of the vehicle.

Following fourth step S4, a fifth step S5 is carried out.

In fifth step S5, a particular region 12 of the image from the virtual camera in which the geometrical projection surface lies in a particular distance range in relation to the virtual camera is ascertained on the basis of the depth map.

In this first specific embodiment, the particular distance range is a range that extends outside a minimum distance in relation to the virtual camera. The minimum distance is a distance in the virtual space, and it is defined by a threshold value in this context. Each distance value of the depth map is compared to the threshold value. If a distance value lies above the threshold value, then the image point of image 10 from the virtual camera belongs to particular region 12. If a distance value lies below the threshold value or is equal to the threshold value, then the image point of the image from the virtual camera associated with this distance value does not belong to particular region 12.

A sixth step S6 is carried out following fifth step S5.

In sixth step S6, Gaussian blurring of the image of the virtual camera takes place in the region in which particular region 12 is imaged. Toward this end, a Gaussian blur tool or some other graphics filter that enables blurring is applied to particular region 12 of image 10 from the virtual camera.

Figure 4:
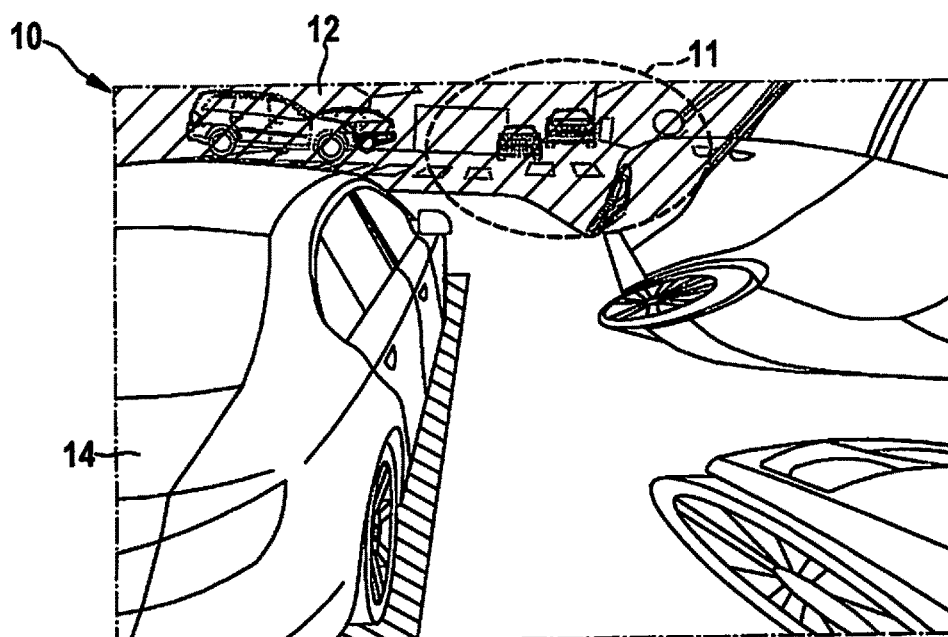
FIG. 4 shows an image of the virtual camera that was created with the aid of the method according to the present invention in the first specific embodiment.

FIG. 4 shows an image 10 from the virtual camera that was generated according to the first specific embodiment of the present invention. Virtual model 14 of vehicle 1 is located in a left region of the image from the virtual camera. The geometrical projection surface with the camera images deposited thereon as textures can be seen in the region around virtual model 14 of vehicle 1. The upper region of image 10 from the virtual camera shows particular region 12 that is blurred and that images a region of the real world that lies in front of vehicle 1. The geometrical projection surface has a distance from the virtual camera in this particular region that is greater than the threshold value according to the depth map. It is clear here that region 11 in which the unintentional difference occurs has been blurred as well.

After sixth step S6 has been executed, the method branches back to first step S1. The method is thus executed in the form of a loop, and the method is ended when device 2 is taken out of operation.

According to the present invention, the depth map is thus set up as a function of the position of the virtual camera. In addition, a partially blurred image of the vehicle environment is generated. In so doing, an image depth may be adapted according to a focal range of an actual camera. This effect is able to be dynamically adapted in order to simulate a behavior of the human eye. This may particularly be achieved by varying the threshold value utilized in fifth step S5.

A second specific embodiment of the present invention corresponds to the first specific embodiment of the present invention. However, the method according to the present invention additionally encompasses a further step, in which an orientation of the virtual camera to a particular point of interest in the virtual space takes place. The particular point of interest is a point at which the vehicle is approaching an object.

For this purpose, it is ascertained with the aid of the distance sensor system of vehicle 1 whether vehicle 1 is approaching an object. The point of interest here is a center of the region of the vehicle environment in which an approach of the object to vehicle 1 takes place. The position of the virtual camera is selected in such a way that it lies directly above point of interest 16 in the virtual space, and an orientation of the virtual camera is selected such that the virtual camera looks down on point of interest 16 from the bird's eye perspective.

Figure 5:
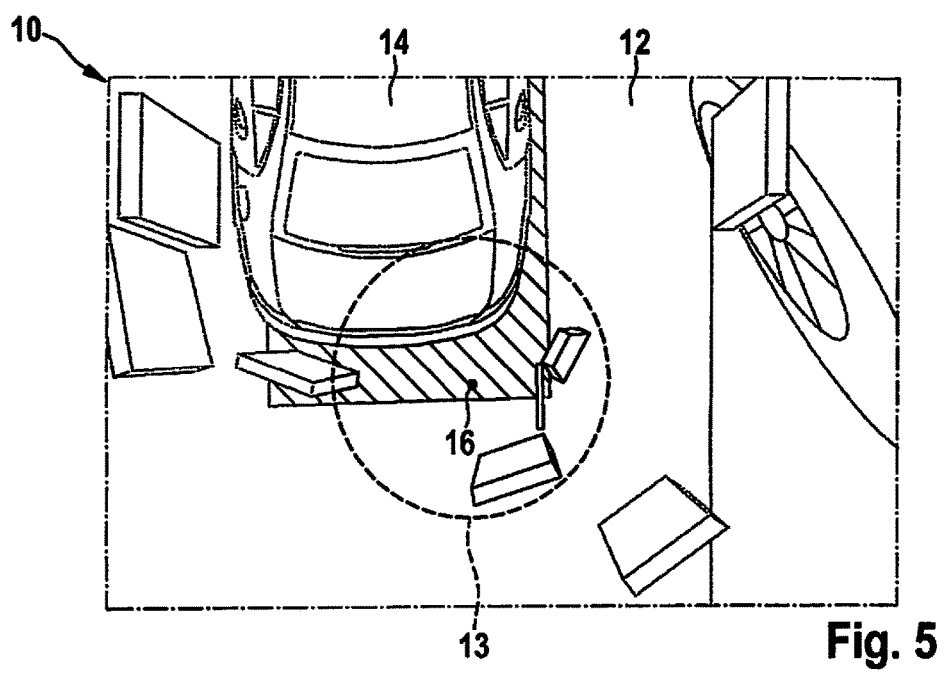
FIG. 5 shows an image of the virtual camera, which was created with the aid of the method according to the present invention in a second specific embodiment.

FIG. 5 shows an image 10 from the virtual camera that was calculated according to the second specific embodiment of the present invention. In the image from the virtual camera shown in FIG. 5, a rear of virtual model 14 of vehicle 1 can be seen. In a focal range 13, which lies to the right behind virtual model 14 of vehicle 1, an approach of vehicle 1 to an object is taking place. The point of interest is placed in the center of this focal range 13.

In the selected position and orientation of the virtual camera, a distance of the geometrical projection plane, which is flat in this region and disposed according to a roadway surface, in relation to the virtual camera increases with growing distance from point of interest 16. In this second specific embodiment, the threshold value of the first specific embodiment is selected in such a way that the particular points of the geometrical projection surface that lie in focal range 13 have a distance from the virtual camera that lies below the threshold value in each case. Focusing range 13 thus corresponds to a region that lies outside of region 12 determined according to the present invention.

Thus, the region of image 10 from the virtual camera that does not lie within this focusing range 13 is blurred. As a result, only focusing range 13 is shown in focus in the image from the virtual camera. A driver's attention is therefore directed toward this region.

It is pointed out that predefined regions of the geometrical projection surface may be excluded from blurring in the method according to the present invention.

In addition to the above written disclosure, explicit reference is made to the disclosure of FIGS. 1 through 5.

What is claimed is:

1. A method for displaying a vehicle environment of a vehicle, comprising:
   detecting the vehicle environment in camera images with the aid of a plurality of cameras;
   projecting the camera images onto a geometrical projection surface in a virtual space;
   creating a depth map for a visual range of a virtual camera that describes a distance of a plurality of points of the geometrical projection surface from the virtual camera in the virtual space;
   calculating an image from the virtual camera that images the geometrical projection surface in the virtual space;
   ascertaining, on the basis of the depth map, a particular region of the image of the virtual camera in which the geometrical projection surface lies in a specific distance range in relation to the virtual camera; and
   Gaussian blurring the image of the virtual camera in the region in which the particular region is imaged.

2. The method as recited in claim 1, wherein the geometrical projection surface is modeled on the basis of the vehicle environment.

3. The method as recited in claim 1, wherein the specific distance range is a range that extends outside a minimum distance in relation to the virtual camera.

4. The method as recited in claim 1, wherein
   a virtual model of the vehicle is located in the virtual space; and
   the depth map is set up in such a way that for those regions of the image from the virtual camera in which the virtual model of the vehicle is detected, the depth map describes a distance of the points of the virtual model of the vehicle imaged therein from the virtual camera.

5. The method as recited in claim 1, further comprising:
orienting the virtual camera to a particular point of interest in the virtual space.

6. The method as recited in claim 5, wherein the particular point of interest is a point at which the vehicle is approaching an object.

7. A device for displaying a vehicle environment of a vehicle, the device designed to:
detect the vehicle environment in camera images with the aid of a plurality of cameras;
project the camera images onto a geometrical projection surface in a virtual space;
create a depth map for a visual range of a virtual camera that describes a distance of a plurality of points of the geometrical projection surface from the virtual camera in the virtual space;
calculate an image from the virtual camera that images the geometrical projection surface in the virtual space;
ascertain, on the basis of the depth map, a particular region of the image of the virtual camera in which the geometrical projection surface lies in a specific distance range in relation to the virtual camera; and
Gaussian blur the image of the virtual camera in the region in which the particular region is imaged.

* * * * *